United States Patent
Rochberger et al.

(10) Patent No.: US 6,614,757 B1
(45) Date of Patent: Sep. 2, 2003

(54) METHOD OF LOCAL FLOW CONTROL IN AN ASYNCHRONOUS TRANSFER MODE NETWORK UTILIZING PNNI ROUTING PROTOCOL

(75) Inventors: Haim Rochberger, Netanya (IL); Ken Benstead, Shrewsbury, MA (US); Alexander Or, Nesher (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/198,170

(22) Filed: Nov. 23, 1998

(51) Int. Cl.⁷ .................................................. H04L 12/26
(52) U.S. Cl. ...................... 370/231; 370/236; 370/395.2
(58) Field of Search ................................. 370/230, 231, 370/235, 236, 236.2, 402, 410, 411, 236.1

(56) References Cited

U.S. PATENT DOCUMENTS

| | | | | |
|---|---|---|---|---|
| 5,463,620 A | * | 10/1995 | Sriram | 370/412 |
| 5,483,536 A | | 1/1996 | Gunji et al. | 370/85.14 |
| 5,537,395 A | * | 7/1996 | Alles et al. | 370/236 |
| 5,550,818 A | | 8/1996 | Brackett et al. | 370/60 |
| 5,566,014 A | | 10/1996 | Glance | 359/124 |
| 5,719,853 A | * | 2/1998 | Ikeda | 370/229 |
| 5,754,530 A | | 5/1998 | Awdeh et al. | 370/234 |
| 5,771,350 A | * | 6/1998 | Kim | 370/905 |
| 5,777,984 A | | 7/1998 | Gun et al. | 370/230 |
| 5,938,749 A | * | 8/1999 | Rusu et al. | 370/412 |
| 5,940,393 A | * | 8/1999 | Duree et al. | 370/392 |
| 6,038,611 A | * | 3/2000 | Masel | 370/395.65 |
| 6,046,983 A | * | 4/2000 | Hasegawa et al. | 370/236.1 |
| 6,052,376 A | * | 4/2000 | Wills | 370/235 |
| 6,094,418 A | * | 7/2000 | Soumiya et al. | 370/231 |
| 6,094,419 A | * | 7/2000 | Ohyoshi et al. | 370/231 |
| 6,118,764 A | * | 9/2000 | Depelteau et al. | 370/231 |
| 6,122,252 A | * | 9/2000 | Aimoto et al. | 370/235 |
| 6,141,323 A | * | 10/2000 | Rusu et al. | 370/236 |
| 6,141,325 A | * | 10/2000 | Gerstel | 370/238 |
| 6,181,703 B1 | * | 1/2001 | Christie et al. | 370/410 |
| 6,246,669 B1 | * | 6/2001 | Chevalier et al. | 370/238 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

* cited by examiner

Primary Examiner—Hassan Kizou
Assistant Examiner—David Odland
(74) Attorney, Agent, or Firm—Howard Zaretsky

(57) ABSTRACT

A method of performing flow control in a PNNI network wherein a node that becomes congested advertises this fact to the network thus eliminating additional call requests and other messages that it cannot handle due to the current load. The method utilizes the Maximum Cell Rate (MCR) and Available Cell Rate (ACR) parameters provided for in the PNNI standard. When the congestion level on a local node exceeds a predetermined threshold, a PTSE with MCR set to zero and ACR set to zero is advertised to the network. The PTSE causes nodes (originating nodes in particular) to not consider that node in route calculations. When the congestion level recedes on the local node, another PTSE is generated with the original MCR and ACR that existed before the congestion occurred causing the resumption of call request messages to be forwarded to the network.

13 Claims, 4 Drawing Sheets

METHOD OF LOCAL FLOW CONTROL IN AN ASYNCHRONOUS TRANSFER MODE NETWORK UTILIZING PNNI ROUTING PROTOCOL

FIELD OF THE INVENTION

The present invention relates generally to data communication networks and more particularly relates to a method of advertising local flow control in an ATM network using the PNNI routing protocol.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by the ATM Forum. The previous Phase 0 draft specification is referred to as the Interim Inter-Switch Signaling Protocol (IISP). The goal of the PNNI specifications is to provide customers of ATM network equipment multi-vendor interoperability.

The Interim Local Management Interface (ILMI) for the PNNI protocol specification provides an auto-port configuration capability. This capability functions to minimize manual configuration operations for PNNI ports of switches. The Phase 0 solution to auto-port configuration is based on hop by hop routing utilizing a 'best match' scheme. The Phase 1 PNNI based solution is based on Open Shortest Path First (OSPF) with the additions necessary for ATM. This scheme is essentially a 'source routing' scheme whereby each node has basic knowledge of the structure of the entire network and uses this knowledge to build a complete path from the source to the destination. When a connection is to be set up from a source to a destination, the source sends out a SETUP message that has within it the address of the destination. Each ATM network node along the way reads the next node from the SETUP message and forwards the message to an appropriate next node. This continues until the SETUP message arrives at its destination.

In the IISP Phase 0 specification standard, the ATM nodes in the network route the signaling SETUP message hop by hop (i.e., node by node) using a 'best match' scheme. ATM addresses are 20 bytes long but only 19 bytes can be used for routing purposes. According to the IISP Phase 0 standard, several prefixes of the ATM address for each link can be registered.

When a node (i.e., an ATM switch) needs to decide to which particular node to route the received SETUP message to, it compares the destination address with all the registered addresses for all of its ports. Only if an address prefix is found that fully matches the destination address can the destination address be considered for routing. After all the prefixes are compared, the prefix address that is the longest is used to determine the routing of the SETUP message. It is important to note that the standard does not require the transfer of any routing information between two neighboring nodes. In addition, the standard also does not permit the use of a TRANSIT NET ID parameter during the signaling phase, which can be used to route to a different routing domain.

A disadvantage of this scheme is that all the prefixes of all neighboring nodes must be registered manually on each of the respective ports. For example, if a port is disconnected from a neighbor and connected to a new neighbor, then the registered addresses must be manually changed in both nodes. This type of network can be termed an absolutely static network.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well known link state routing technique.

The second protocol is effective for signaling, i.e., the message flows used to establish point-to-point and point-tomultipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical length becomes operational, the nodes attached to it initiate and exchange information via a well known Virtual Channel Connection (VCC) used as a PNNI Routing Control Channel (RCC).

Hello message are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and a status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical length begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet that is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originally originated a particular PTSE can re-originate that PTSE. PTSEs are reissued both periodically and on an event driven basis.

As described previously, when a node first learns about the existence of a neighboring peer node which resides in the same peer group, it initiates the database exchange process in order to synchronize its topology database with that of its neighbor's. The database exchange process involves exchanging a sequence of database summary packets that contain the identifying information of all PTSEs in a node's topology database. The nodes perform an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

A corresponding neighboring peer data structure is maintained by the nodes located on either side of the link. The neighboring peer data structure includes information required to maintain database synchronization and flooding to neighboring peers.

It is assumed that both nodes on either side of the link begin in the Neighboring Peer Down state. This is the initial state of the neighboring peer for this particular state machine. This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peering state machine. The database exchange process commences with the event AddPort that is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is in the Negotiating state that the first step is taken in creating an adjacency between two neighboring peer nodes. During this step it is decided which node is the master, which is the slave and it is also in this state that an initial Database Summary (DS) sequence number is chosen. Once the negotiation has been completed, the Exchanging state is entered. In this state the node describes is topology database to the neighboring peer by sending database summary packets to it.

After the peer processes the database summary packets, any missing or updated PTSEs are requested. In the Exchanging state the database summary packets contain summaries of the topology state information contained in the node's database. In the case of logical group nodes, those portions of the topology database that where originated or received at the level of the logical group node or at higher levels are included in the database summary. The PTSP and PTSE header information of each such PTSE is listed in one of the node's database packets. PTSEs for which new instances are received after the exchanging status has been entered may not be included in any database summary packet since they will be handled by normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state.

However, if the PTSE request list is not empty then the Loading state is entered once the node's last database summary packet has been sent but the PTSE request list is not empty. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet that contains one or more entries from the PTSE request list. The PTSE request list packets are only sent during the Exchanging state and the Loading state. The node can send a PTSE request packet to a neighboring peer and to any other neighboring peers that are also in either the Exchanging state or the Loading state and whose database summary indicates that they have the missing PTSES.

The received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list has been received, the node moves from the Loading state to the Full state. Once the Full state has been reached, the node has received all PTSEs known to be available from its neighboring peer and links to the neighboring peer can now be advertised within PTSEs.

IISP

IISP is a method of routing and performing auto registration (auto configuration) in an ATM network. The method simplifies the configuration and routing for ATM networks having a relatively large number of nodes. Networks are constructed in hierarchical fashion in the form of branches and trees and assigned network address prefixes in accordance with their location in the network. Network nodes periodically exchange identification information permitting both switches on either side of a link to be aware of who they are connected to. Each node registers a network address and an associated significant length for each of its neighbors on each of its links. A node performs routing by comparing the destination address against each of its registered addresses for all its links. The routing method takes advantage of the network address prefix to ensure that the routing proceeds in the correct direction towards the destination and does not enter a tree or a branch that does not contain the destination. In addition, each node performs load balancing at each point in the routing process. A node can generate crankback messages if the routing leads to a dead end.

In the address prefix exchange method, each node knows who its neighbors are. This is accomplished by each node sending out on all its NNI ports an identification message that comprises the address prefix assigned to it and its significant length. This message is sent out periodically (e.g., every second). The nodes that receive it compare the address prefix in the message to the special NNI type address registered on the port the message was received on. If the addresses do not match or if there is no NNI address registered, then the node makes the received address prefix the new registered NNI address for that port and changes its routing tables accordingly. If the addresses do match, the message is ignored.

Each node sending out identification messages on a periodic basis automatically permits the node to detect almost immediately if it becomes connected to a new neighbor. If a change is detected, the node modifies its routing tables accordingly. In addition, since each node address prefix is unique and is assigned in hierarchical fashion as described above, it is guaranteed that either the local address prefix (i.e., the address prefix of the node itself) or the remote node address prefix will be smaller.

The IISP signaling specification requires that one side of a link be denoted as the USER and the other side as the NETWORK. In networks constructed in accordance with the present invention, on NNI links, if the significant length of the local prefix (i.e., of the node itself) is shorter than that of a neighbor, then the local side is set as the NETWORK. This particular link attribute setting allows the signaling to automatically align after a dynamic link replacement when a node's neighbors are changed.

Thus, the automatic exchange of network address prefixes causes the routing tables of each node to be updated and permits the signaling to 'come up'. This is in contrast to IISP Phase 0 which requires that link attributes to be set manually. This method is thus especially advantageous in large networks of more than two nodes.

As an alternative to the automatic exchange of network addresses, the transfer of addresses can be performed manually at each node or can be performed in accordance with ILMI registration procedures.

Note that the above described PNNI and IISP routing schemes are inherently different. In PNNI only full address matching is permitted, i.e., an address must fully match the address entry in the topology database. In contrast, IISP permits partial address matching. The IISP routing method is a partially static routing scheme.

In addition, there are many ATM switches currently in operation that support only the IISP type routing. It is desirable to permit the owners of many of these older ATM switches to upgrade their switches to the more modem PNNI type routing. Upgrades can be performed by upgrading the operating software within the switches. In order to permit upgraded nodes to operate in a PNNI network, the upgraded switches can only support a minimal PNNI configuration. This means that the hierarchical features of PNNI are not supported. More specifically, in a minimal subset of PNNI, a node cannot finction as a border node or as a Peer Group Leader (PGL). A border node is a node that has a link to another peer group and executes a special finite state machine (FSM). The PGL is the node that represents the whole peer group and functions as the key component for building large hierarchical networks.

A conflict exists, however, since a major benefit of PNNI is its ability to permit network designers to construct large hierarchical networks. Using PNNI, networks can be constructed that comprise peer groups having from dozens to over a hundred nodes. The concept is that many nodes in the same peer group can be represented as one node in a higher level of the hierarchy. Since PNNI utilizes a link state, source routing type routing scheme wherein each node has a view of the entire network, it is the hierarchy that permits the division of the network view into smaller chunks. In PNNI, very large portions of the network comprising a large number of nodes may be viewed by nodes in other peer groups as a single logical node.

Example ATM Network Illustrating Flow Control Problem

A diagram illustrating an example ATM network having a source and destination node whereby several source users attempt to establish connections with a single destination node is shown in FIG. 1. The ATM network 10 comprises a plurality of nodes some of which are edge devices to source and destination users. A plurality of source users 12 labeled #1 through #5 are connected to source edge devices 14 labeled #1 through #5, respectively. The five source edge devices 14 are connected to one or more originating and intermediary nodes 22. A local node 16 is also connected to the one or more intermediary nodes 22. A destination edge device 18 is connected to the local node 16. A destination user 20 is connected to the destination edge device. As an example, the local node is shown having three input ports and one output port. Note that the node each edge device is connected to is termed an originating node in PNNI parlance.

Note that the ATM network shown in FIG. 1 is presented as an example to aid in understanding the principles of the present invention. Other network configurations are possible without limiting the scope of the present invention.

A block diagram illustrating an example local node having N input ports and one output port connected to downstream devices is shown in FIG. 2. A node 30, designated the local node, comprises N input ports labeled #1 through #N and a single output port. The input ports are connected to upstream nodes and the output port is connected to a downstream node. This example node is applicable when many source users attempt to connect to a single destination. As described in more detail below, this may occur during network startup such as when many LECs attempt to connect to a single LECS.

Note that it is assumed that the nodes in the example network in FIG. 1 utilize the PNNI protocol. The PNNI protocol utilizes the Q.2931 standard for signaling functions and utilizes an associated protocol called Signaling ATM Adaptation Layer (Q.SAAL) for the lower ATM Adaptation Layer (AAL) layer signaling. The Q.SAAL signaling protocol utilizes the well known sliding window and acknowledgment mechanism to ensure that messages arrive correctly at the remote peer.

A problem arises, however, when a node receives a large number of messages from many ports at substantially the same time. This may occur, for example, when the network is first switched on and brought up for the first time or when it is brought up after a power failure, major network failure or any other scenario when many devices try to connect to the same destination port at substantially the same time. This may occur, for example, when one or more LAN Emulation Servers (LESs) are running on the network and a large group of nodes are brought up at the same time wherein each node attempts to register with the LECS. It may also be the case that the destination LECS is located in the network such that most of the connections from the LECS to most nodes pass through a particular link.

In this case, one of the intermediary nodes, referenced the local node 16 in FIG. 1, receives in parallel a large number of messages from many of its inputs ports when the LAN Emulation Clients (LECs) attempt to connect to the LECS (assume the LECS is running on the destination edge device 18 or the destination user machine 20). All the messages received on the local node via its input ports must be forwarded to the same output port. When this occurs, it is highly likely, depending on the resources of the node, that the output port will become congested and the Q.SAAL signaling will try to queue as many signaling messages in a near 'endless' list of messages in an attempt to assure their transmission and safe arrival at the destination.

Thus a problem occurs when the Q.SAAL signaling software queues too many messages and most of the message resources in the node, i.e., message memory buffers, etc., get placed into the Q.SAAL queues resulting in a node crash. Worse, the node remains active but does not function properly. Upon a crash, the node may cease to operate properly or may automatically reboot, clearing its memory buffers and existing topology database, e.g., PTSE and PTSP information.

To avoid a node crash or reboot from occurring, a prior art solution to this problem is to forward an indication of the existence of the congestion to higher layers of the application, e.g., to the Call Control (CC), when the congestion on the particular port exceeds a threshold. The CC, in turn, responds by not using the congested port for routing new calls. As a consequence, the GCAC will fail for any destination using that particular link in its routing path. When it is detected that the congestion has eased, the CC is notified that the congestion has receded to an acceptable level. The CC then begins to use this port again for calls.

A disadvantage of this prior art solution is that when a node is in the congested state, RELEASE messages are generated for each call setup attempt with the reason for call rejection: lack of sufficient resources. The release messages are returned to the source node that generated the SETUP message for the call. The local node generates release messages in response to the congestion on its output port. If the node has numerous input ports, it will be forced to release the call requests when an output port becomes congested.

As a consequence of this, a heavy workload on the CPU in the local port. The CPU spends a large amount of time responding to the call connect attempts with release message replies. In addition, this extra heavy workload is performed in vain as release messages will be returned as long as the output port is congested. This only further hinders and delays the node from clearing the congestion state on its output port.

A prior art solution to solve this problem is to modify the edge devices that generate the call SETUP request messages with a back off mechanism so that when a release message is received from a node with congestion, the node waits a random amount of time before transmitting the SETUP request message again. When the edge device receives the release for the first time, it waits a random time period chosen from within a first time range, e.g., 1 to 5 seconds. The second time the edge device receives the release from the node with the congested port, it waits a random time period chosen from a second time range, e.g., 10 to 15 seconds. In this manner each node trying to connect through the congested node waits a random time before retrying. In addition, the larger the number of release messages received, the longer the time period the node waits to retransmit the setup request message.

A problem with this solution is that the congestion may have cleared up while the edge device may have just begun its random waiting time period and is thus forced to wait a relatively long period of time with the congestion problem cleared. A second problem is that this solution requires that the back off mechanism software in each edge device be modified to implement this method. This is most likely difficult and costly to do in a majority of networks since the edge device may be manufactured from numerous different vendors. Another disadvantage of this solution is that the congested node continues to be besieged with the setup and add party messages that it cannot route anyway due to the congestion. This is very wasteful of node computing resources and network bandwidth.

Yet another prior art solution is to have the node flush the link connected to the output port when the level of congestion exceeds a threshold. The link can be flushed by advertising a PTSE to this effect. When the congestion subsides, the link data is written back to the topology database via another PTSE.

A major problem with this solution is that although, new calls to this output port may temporarily cease, the link being flushed causes problems in other areas. For example, if the link is flushed, the node cannot participate in peer group leader (PGL) elections. This occurs because the PNNI software will determine that the node does not have any connectivity resulting in a crash of the PNNI hierarchy that existed before the link was flushed.

SUMMARY OF THE INVENTION

The present invention is a method of performing flow control in a PNNI network. Using the method of the present invention, a node that becomes congested is able to advertise this fact to the network thus eliminating additional call requests and other messages that it cannot handle due to its current load. The method utilizes the Maximum Cell Rate (MCR) and Available Cell Rate (ACR) parameters that are already a part of the PNNI standard. When the congestion level on a local node exceeds a predetermined threshold, a PTSE with MCR set to zero and ACR set to zero is advertised to the network.

In response, all devices that receive this PTSE update their topology databases accordingly. The PTSE causes nodes (node attached to an edge device, i.e., originating node) to not consider that link in route calculations. Setting the MCR parameter to zero prevents UBR calls and setting ACR to zero prevents calls having other types of QoS. When the congestion level recedes on the local node, another PTSE is generated with the original MCR and ACR that existed before the congestion occurred.

In this fashion, the pressure of the congestion is distributed to a plurality of originating nodes. The originating nodes, in response to the source users requesting call connections, will not forward the call requests to upstream nodes while the MCR and ACR parameters are set to zero in their topology databases. Re-transmissions of the setup request messages from the source user are blocked at the originating node.

Once the PTSE with the original MCR and ACR values is received by an originating node, the call request messages are forwarded to the network without delay. Hysteresis can be employed to reduce oscillations in the network by making the threshold for determining the congestion state higher than the threshold for removing the congestion state.

The method permits faster network convergence times as random delays are not required as in the prior art. In addition, PGL election is not effected as only node reachability is of a concern here.

There is provided in accordance with the present invention, in an Asynchronous Transfer Mode (ATM) network, a method of flow control on a local node having at least one Private Network to Network Interface (PNNI) port, the PNNI port in a FULL state, the method comprising the steps of determining that the port is in a congested state when the number of messages in a signaling queue associated with the port exceeds a first threshold, flooding a first message to the network advertising that the port on the local node is not available for routing calculations, wherein originating nodes, in response to the first message, will not forward the setup request messages received from source users connected thereto to the network, determining that the port is not in a congested state when the number of messages in the signaling queue associated with the port drops below a second threshold and flooding a second message to the network advertising that the port on the local node is available for routing calculations.

The signaling queue may include a message queue associated with the Signaling ATM Adaptation Layer (Q.SAAL) signaling stack. The step of flooding the first message comprises generating and flooding a link PNNI Topology State Element (PTSE) wherein the values of the parameters Maximum Cell Rate (MCR) and Available Cell Rate (ACR) are set to zero. The step of flooding the second message comprises generating and transmitting a link PNNI Topology State Element (PTSE) wherein the values of the parameters Maximum Cell Rate (MCR) and Available Cell Rate (ACR) are set to zero.

There is also provided in accordance with the present invention, in an Asynchronous Transfer Mode (ATM) network, a method of flow control on a local node having at least one User to Network Interface (UNI) port, the UNI port in a Q.SAAL transfer mode (signaling up) state, the method comprising the steps of determining that the port is in a congested state when the number of messages in a signaling queue associated with the port exceeds a first threshold, flooding a first message to the network advertising that the port on the local node is not available for routing calculations, wherein originating nodes, in response to the first message, will not forward the setup request messages received from source users connected thereto to the network, determining that the port is not in a congested state when the number of messages in the signaling queue associated with the port drops below a second threshold and flooding a second message to the network advertising that the port on the local node is available for routing calculations.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| AAL | ATM Adaptation Layer |
| ABR | Absolute Bit Rate |
| ACR | Available Cell Rate |
| ANSI | American National Standards Institute |
| ATM | Asynchronous Transfer Mode |
| CBR | Constant Bit Rate |
| CC | Call Control |
| CCITT | Comite Consulatif International Telegraphique et Telephonique |
| CPU | Central Processing Unit |
| E-IISP | Enhanced-Interim Inter-Switch Signaling Protocol |
| FDDI | Fiber Distributed Data Interface |
| FSM | Finite State Machine |
| GCAC | Generic Connection Admission Control |
| IISP | Interim Inter-Switch Signaling Protocol |
| ITU | International Telecommunications Union |
| LEC | LAN Emulation Client |
| LECS | LAN Emulation Configuration Server |
| LES | LAN Emulation Server |
| MCR | Maximum Cell Rate |
| NNI | Network to Network Interface |
| PGL | Peer Group Leader |
| PNNI | Private Network to Network Interface |
| PTSE | PNNI Topology State Element |

-continued

| Term | Definition |
| --- | --- |
| PTSP | PNNI Topology State Packet |
| PVC | Permanent Virtual Circuit |
| Q.SAAL | Signaling ATM Adaptation Layer |
| QoS | Quality of Service |
| RCC | Routing Control Channel |
| SVC | Switched Virtual Circuit |
| UBR | Unspecified Bit Rate |
| UNI | User to Network Interface |
| VBR | Variable Bit Rate |
| VCC | Virtual Channel Connection |

General Description

The method of the present invention advertises local flow control in order to relieve and reduce congestion on a particular port on a node. The method utilizes features that are currently part of the PNNI standard as described in more detail in PNNI Specification Version 1.0 published by the ATM Forum. In particular, the PNNI standard in Sections 5.8.1.1.3.7 and 5.8.1.1.3.8 of the PNNI Specification Version 1.0, defines Maximum Cell Rate (MCR) and Available Cell Rate (ACR) parameters. The MCR parameter is defined as the maximum capacity usable by connections belonging to a specified service category. The MCR is an optional topology attribute for CBR, real time VBR and non-real time VBR service categories. The MCR parameter is expressed in units of cells per second. MCR equal to zero is a special case which is used to indicate an inability to accept new connections in UBR and ABR service categories.

The ACR attribute is a measure of effective available capacity for CBR, real time VBR and non-real time VBR service categories. For ABR service, ACR is a measure of capacity availability for minimum cell rate reservation. Note that ACR is a required topology attribute for CBR, real time VBR, non-real time VBR and ABR service categories. ACR is not applicable to the UBR service category. ACR is expressed in units of cells per second.

The inability to accept new connections may occur, for example, when a node exhausts all available VCCs or when traffic is very heavy. This results in the inability of the node to accept new calls.

Figure 1:
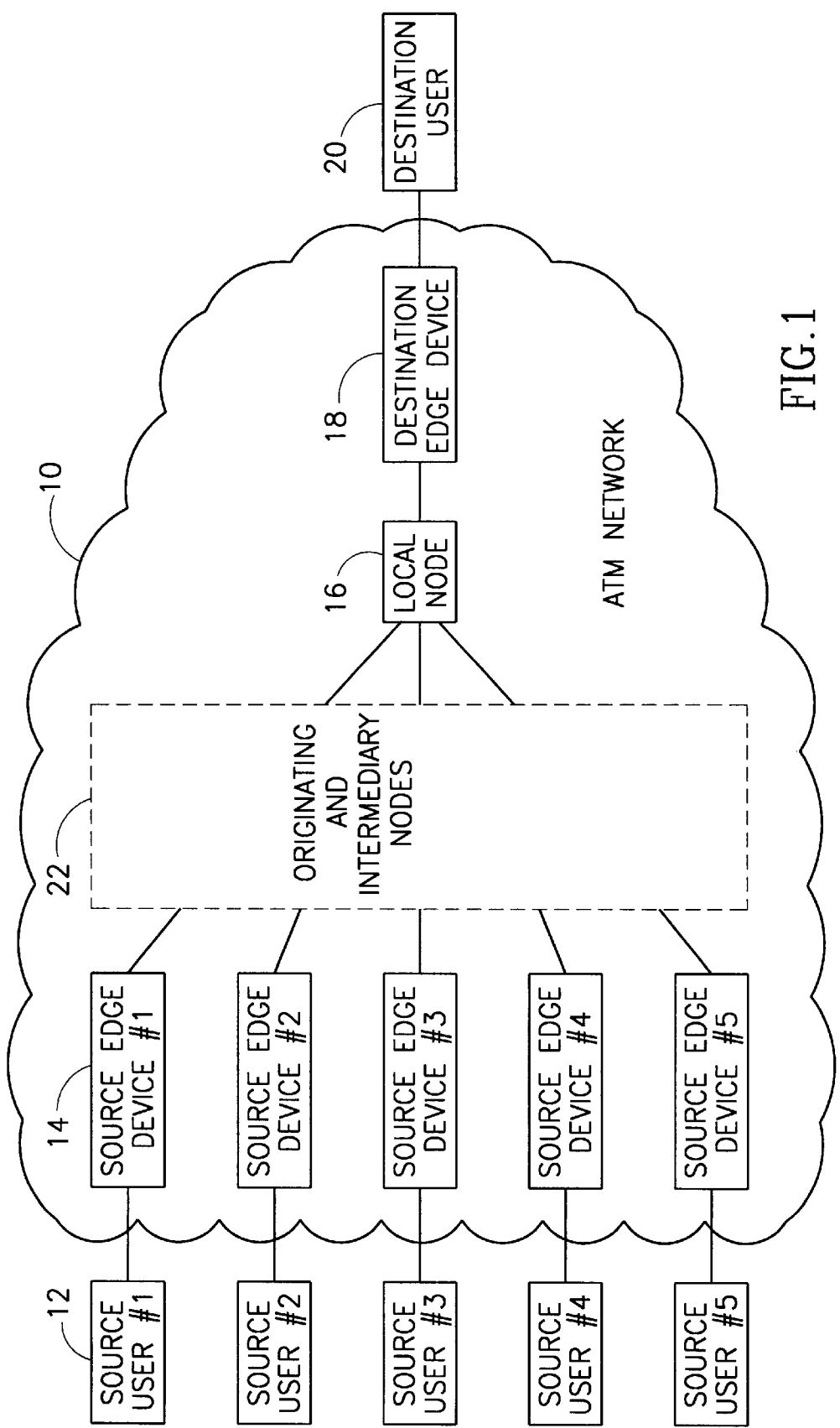
FIG. 1 is a diagram illustrating an example ATM network having a source and destination node whereby several source users attempt to establish connections with a single destination node.
Figure 2:
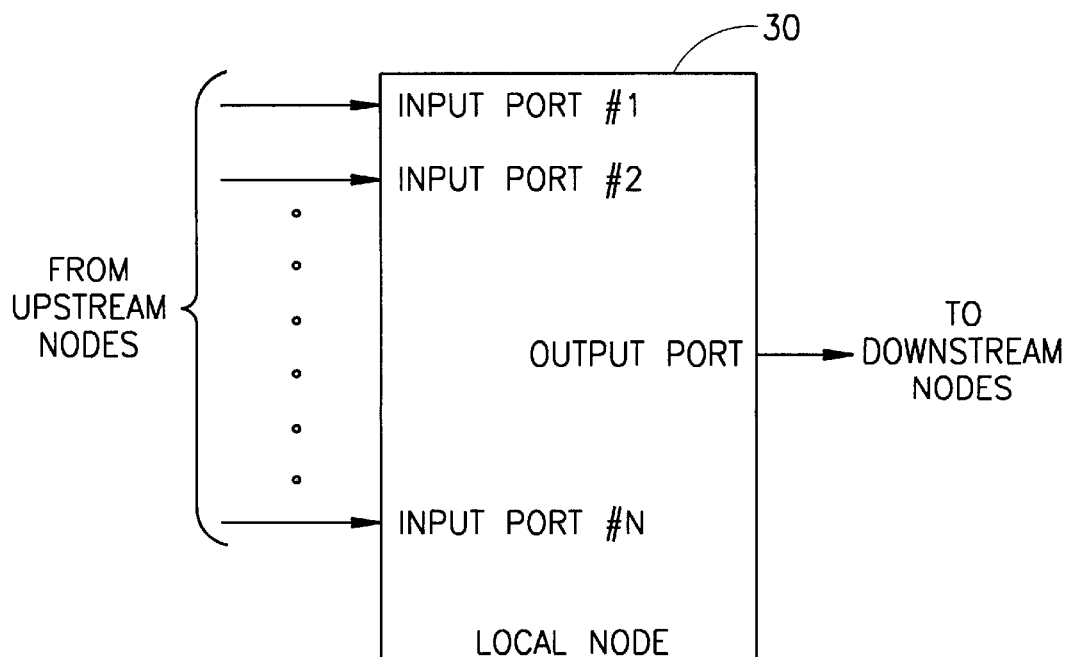
FIG. 2 is a block diagram illustrating an example local node having N input ports and one output port connected to downstream devices.
Figure 3:
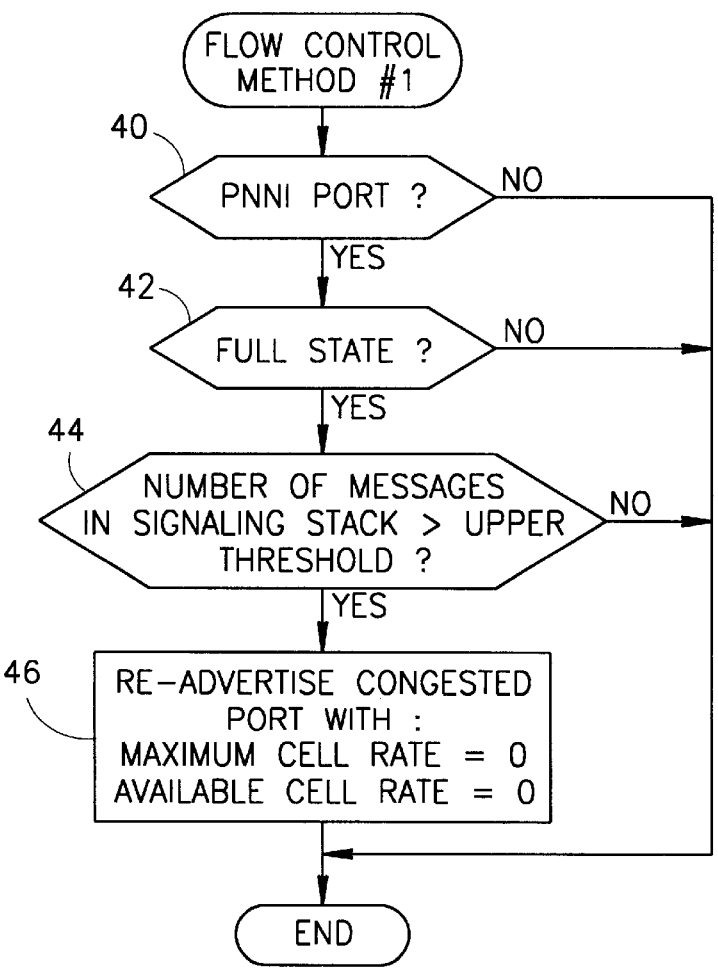
FIG. 3 is a flow diagram illustrating the method of the present invention for applying flow control to a PNNI port in a local node.

A flow diagram illustrating the method of the present invention for applying flow control to a port in a local node is shown in FIG. 3. The method of the present invention is applicable to nodes that comprise PNNI ports (step 40). A port is a PNNI port if it connects two nodes with PNNI protocol capability. The port also must be in the FULL state within the context of the PNNI Finite State Machine (FSM) (step 42).

It is then checked whether a state of congestion exists on the port (step 44). This is determined when the number of messages in the signaling stack, e.g., the Q.SAAL signaling stack queue, is greater then a threshold. Preferably, hysteresis is employed to prevent oscillations. In this case, the number of messages in the Q.SAAL signaling stack queue must be greater than an upper threshold. If it is, then that particular port is re-advertised by flooding a PTSE with MCR equal to zero and ACR equal to zero (step 46). Note that the PTSE transmitted has a higher sequence number to force receiving nodes to update their topology databases.

This causes the particular link experiencing congestion to not be used for routing Via regardless of the class of service requested. Setting MCR to zero causes the link not to be used for routing UBR calls and setting ACR to zero causes the link not to be used for routing other classes of calls, i.e., CBR, ABR and VBR. More specifically, the GCAC in the edge device will fail for any destination using that particular link in its routing path. The link, however, can still be considered for PGL election in PNNI thus preserving the integrity and stability of the existing PNNI hierarchy.

Thus, if a UNI or an IISP port becomes congested, the address associated with that particular port is advertised with zero matrices for the MCR and ACR fields. If the address advertised is the default node prefix, then it is possible to advertise the FULL address associated with that port. In this fashion, when an edge node routes specifically to that particular address, it will determine that the node does not have sufficient resources and will find an alternate route if one exists. An advantage is that access to the other addresses on the network are not disturbed.

Figure 4:
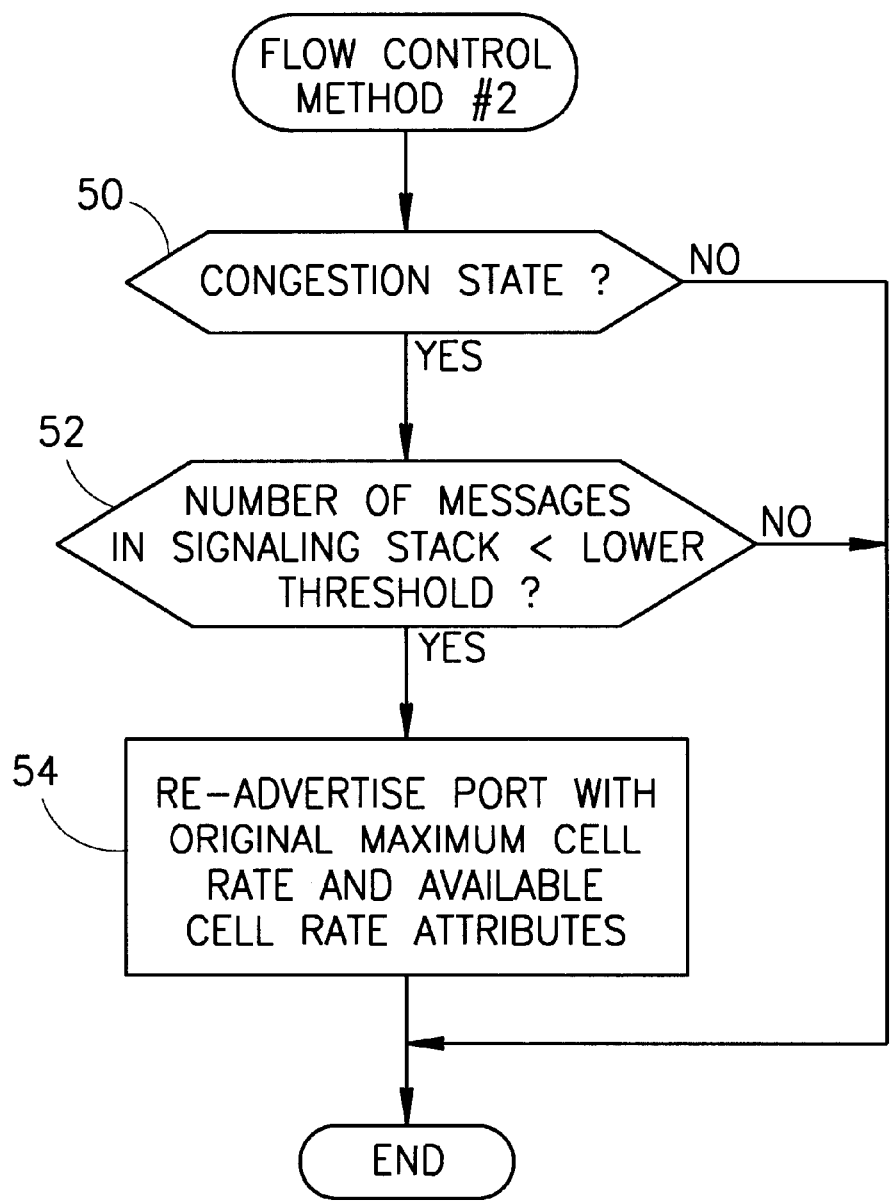
FIG. 4 is a flow diagram illustrating the method of the present invention for removing flow control from a PNNI port in a local node.

A flow diagram illustrating the method of the present invention for removing flow control from a port in a local node is shown in FIG. 4. If the node was previously in the congestion state (step 50), it is periodically checked whether the node can be taken out of that state. This occurs when the number of messages in the signaling stack queue, e.g., Q.SAAL signaling stack, drops below a lower threshold (step 52). Typically, the number of messages in the queue is checked every time a message is added to or deleted from the message queue. A counter is maintained that holds the current number of messages in the message queue.

Note that the lower threshold must be lower than the upper threshold in order to implement hysteresis in the node. Once the number of messages drops below the lower threshold, the node re-advertises the port (link) by flooding a PTSE with the original MCR and ACR as before the congestion occurred (step 54). Note that the PTSE transmitted has a higher sequence number to force receiving nodes to update their topology databases.

Thus, re-advertising the congested link with MCR and ACR parameters set to zero effectively informs the network that the link is in a flow control situation. Once the PTSE advertising this fact is received by edge devices, the link will not be included in route calculations. Even though re-attempts by the edge device at setting up the call are sent from the edge device to the originating node, the originating node does not forward them to the network. In this fashion, the congestion pressure that would have been generated by multiple sources attempting to connect to the same destination is instead distributed to the edges of the network and contained therein until the congestion in the local node clears. When the congestion drops below the lower threshold, the link is re-advertised with PTSEs using the original QoS parameters before congest ion occurred.

It is important to note that this method also operates with switches that do not support this method. Only the local node experiencing the congestion is required to perform the method. The edge devices and other nodes in the network do not need to.

Another advantage is that the source node originating the call, will have knowledge of the fact that a specific node is currently not available for routing due to flow control. Thus, the source node will not transmit the SETUP message to the node. This makes it much easier for the congested node to clear itself from the congested state. Note that this method has even greater benefit when many source nodes attempt to connect to the same destination node as in the case of many LECs attempting connection to a single LECS.

A further advantage is that no changes are required to the edge devices as was the case in the prior art solution. The originating nodes continue to utilize the PNNI standard protocol. In addition, the edge devices are not required to wait a random time period before retransmitting their SETUP request. Using the method of the present invention, the originating node (attached directly to the edge device) immediately retransmits its SETUP request message once the PTSE with the re-advertisement is received, thus increasing utilization of the link. Further, the network convergence times are lower for networks using this method. In laboratory measurements, the inventors have found much faster convergence times for PNNI networks using the method as compared with IISP or E-IISP networks not using the method.

An additional benefit already mentioned is that the method does not effect the PGL election in PNNI because the PGL election process only examines the reachability of a node and not its quality of service and various call rate parameters, e.g., MCR and ACR.

It is important to point out that the method of the present invention is also applicable to other types of ports besides PNNI ports. In particular, the method is applicable to UNI ports. Similar to the advertisement of the link PTSE in the method described in connection with FIGS. 3 and 4, the method for UNI ports also advertises a PTSE, the PTSE being an address PTSE in contrast thereto. The congested node advertises either the network prefix or the full network address of a congested UNI port via an address PTSE. In accordance with the PNNI protocol, all the nodes in the network advertise their reachable nodes and ports and store this information in their topology database.

Figure 5:
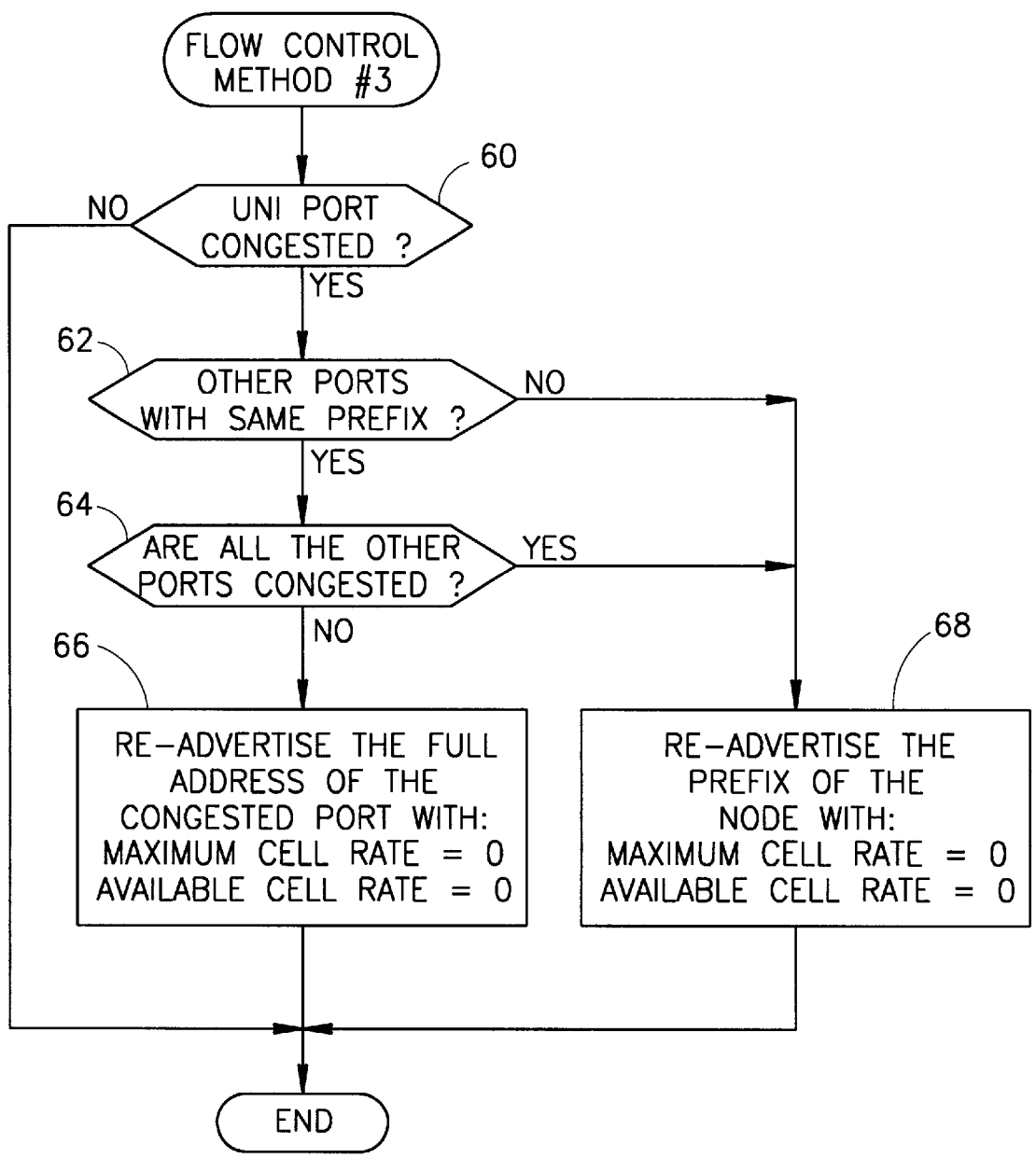
FIG. 5 is a flow diagram illustrating the method of the present invention for applying flow control to a UNI port in a local node.

A flow diagram illustrating the method of the present invention for applying flow control to a UNI port in a local node is shown in FIG. 5. It is first checked whether a state of congestion exists on the port (step 60). This is determined when the number of messages in the signaling stack, e.g., the Q.SAAL signaling stack queue, is greater then a threshold. Preferably, hysteresis is employed to prevent oscillations. In this case, the number of messages in the Q.SAAL signaling stack queue must be greater than an upper threshold.

If a port is found to be congested, then it is checked whether there are any other ports with the same prefix on that node (step 62). If there are none, than only the network prefix need be advertised in the address PTSE with Maximum Cell Rate set to zero and Available Cell Rate set to zero (step 68).

If there are other ports with the same prefix, then it is checked whether the other ports are also congested (step 64). If they all are also congested, then the address PTSE is re-advertised with only the network prefix and with Maximum Cell Rate set to zero and Available Cell Rate set to zero (step 68) the address prefix comprises the most significant 13 bytes of the node address. The 6 byte MAC address is not needed as either all the ports are congested or the node only has one port.

If not all the other ports are congested, then the address PTSE is advertised with the full address of the congested port and with Maximum Cell Rate set to zero and Available Cell Rate set to zero (step 66). Note that the full address is typically 19 bytes of the full 20 byte node address as the last byte (selector byte) is not used for routing.

Note that in both cases, the address PTSE transmitted has a higher sequence number to force receiving nodes to update their topology databases.

While the invention has been described with respect to a limited number of embodiments, it will be appreciated that many variations, modifications and other applications of the invention may be made.

What is claimed is:

1. A method of flow control in a local node in an Asynchronous Transfer Mode (ATM) network, said local node having one or more Private Network to Network Interface (PNNI) ports, said method comprising the steps of:

determining that a port is in a congested state when the number of messages in a signaling queue associated with said port exceeds a first threshold;

flooding a first message to said network advertising that said port on said local node is not available for routing calculations, wherein originating nodes, in response to said first message, do not forward setup request messages received from source users connected thereto to said network, wherein said first message comprises Maximum Cell Rate (MCR) and Available Cell Rate (ACR) parameters set to zero;

determining that said port is not in a congested state when the number of messages in said signaling queue associated with said port drops below a second threshold; and flooding a second message to said network advertising that said port on said local node is available for routing calculations, wherein said second message comprises MCR and ACR parameters restored to their original values before said congestion occurred.

2. The method according to claim 1, wherein said signaling queue comprises a message queue associated with the Signaling ATM Adaptation Layer (Q.SAAL) signaling stack.

3. The method according to claim 1, wherein said first threshold is set higher than said second threshold so as to provide hysteresis.

4. A method of flow control in a local node in an Asynchronous Transfer Mode (ATM) network, said local node having at least one User to Network Interface (UNI) port, said method comprising the steps of:

determining that said port is in a congested state when the number of massages in a signaling queue associated with said port exceeds a first threshold;

flooding a first message comprising Maximum Cell Rate (MCR) and Available Cell Rate (ACR) parameters set to zero to said network advertising that said port on said local node is not available for routing calculations, wherein originating nodes, in response to said first message, do not forward setup request messages received from source users connected thereto to said network;

determining that said port is not in a congested state when the number of messages in said signaling queue associated with said port drops below a second threshold; and flooding a second message comprising MCR and ACR parameters restored to their original values before said congestion occurred to said network advertising that said port on said local node is available for routing calculations.

5. The method according to claim 4, wherein said signaling queue comprises a message queue operable with the Signaling ATM Adaptation Layer (Q.SAAL) signaling stack.

6. The method according to claim 4, wherein said first threshold is set higher than said second threshold so as to provide hysteresis.

7. A method of flow control in a local node in a network of nodes running a link state source routing algorithm whereby routing and topology information are distributed to nodes in said network via each node advertising to neighboring nodes one or more topology state elements, said method comprising the steps of:

monitoring the number of messages in a signaling queue associated with each port in said local node;

advertising first one or more topology state elements to all source nodes using standard protocol topology state element exchange mechanism when the number of messages in said signaling queue exceeds a first threshold thereby indicating to all source nodes that said local node is congested and not available for route calculations, wherein said first one or more topology state elements comprises Maximum Cell Rate (MCR) and Available Cell Rate (ACR) parameters set to zero; and advertising second one or more topology state elements to all source nodes using standard protocol topology state element exchange mechanism when the number of messages in said signaling queue is lower than a second threshold thereby indicating to all source nodes that said local node is not congested and available again for route calculations, wherein said second one or more topology state elements comprises MCR and ACR parameters restored to their original values before said congestion occurred.

8. The method according to claim 7, wherein said link stage source routing comprises Private Network to Network Interface (PNNI) Asynchronous Transfer Mode (ATM) network based routing.

9. The method according to claim 7, wherein said standard topology state element exchange mechanism comprises a flooding mechanism of Private Network to Network Interface (PNNI) based Asynchronous Transfer Mode (ATM) networks.

10. The method according to claim 7, wherein said steps of advertising comprise standard flooding mechanism of Private Network to Network Interface (PNNI) based Asynchronous Transfer Mode (ATM) networks.

11. The method according to claim 7, wherein said first threshold is greater than said second threshold so as to implement hysteresis.

12. A flow control apparatus for use in a local node in a network of nodes running a link state source routing algorithm whereby routing and topology information are distributed to nodes in said network via each node advertising to neighboring nodes one or more topology state elements, said method comprising the steps of:

monitoring means for monitoring the number of messages in a signaling queue associated with each port in said local node;

first advertising means for advertising first one or more topology state elements to all source nodes using standard protocol topology state element exchange mechanism when the number of messages in said signaling queue exceeds a first threshold thereby indicating to all source nodes that said local node is congested and not available for route calculations, wherein said first one or more topology state elements comprises Maximum Cell Rate (MCR) and Available Cell Rate (ACR) parameters set to zero; and second advertising means for advertising second one or more topology state elements to all source nodes using standard protocol topology state element exchange mechanism when the number of messages in said signaling queue is lower than a second threshold thereby indicating to all source nodes that said local node is not congested and available again for route calculations wherein said second one or more topology state elements comprises MCR and ACR parameters restored to their original values before said congestion occurred.

13. A method of reducing congestion in an Asynchronous Transfer Mode (ATM) network, said method comprising the steps of:

determining that a port is in a congested state when the number of messages in a signaling queue associated with said port exceeds a threshold;

advertising the congested state of said port to a plurality of originating nodes by flooding a first message having Maximum Cell Rate (MCR) and Available Cell Rate (ACR) parameters set to zero to said network thereby indicating that said port is not available for routing, wherein originating nodes, in response to source users requesting call connections do not forward setup request messages to upstream nodes;

determining that said port is not in a congested state when the number of messages in said signaling queue associated with said port drops below said threshold; and flooding a second message comprising MCR and ACR parameters restored to their original values before said congestion occurred thereby indicating to said network that said port is available for routing.

* * * * *